(12) United States Patent
Wolf et al.

(10) Patent No.: US 12,738,576 B2
(45) Date of Patent: Sep. 15, 2026

(54) BATTERY SHELL HAVING A REINFORCING NONWOVEN, METHOD OF PRODUCTION, AND TRACTION BATTERY

(71) Applicant: KAUTEX TEXTRON GmbH & Co. KG, Bonn (DE)

(72) Inventors: Hartmut Wolf, Königswinter (DE); Weiwei Zhao, Bonn (DE)

(73) Assignee: KAUTEX TEXTRON Gmbh & Co. KG, Bonn (DE)

(*) Notice: Subject to any disclaimer, the term of this patent is extended or adjusted under 35 U.S.C. 154(b) by 658 days.

(21) Appl. No.: 18/034,497

(22) PCT Filed: Oct. 27, 2021

(86) PCT No.: PCT/EP2021/079894
§ 371 (c)(1),
(2) Date: Apr. 28, 2023

(87) PCT Pub. No.: WO2022/090349
PCT Pub. Date: May 5, 2022

(65) Prior Publication Data

US 2024/0063480 A1 Feb. 22, 2024

(30) Foreign Application Priority Data

Oct. 29, 2020 (DE) ..................... 10 2020 128 528.0

(51) Int. Cl.
*H01M 50/14* (2021.01)
*H01M 50/124* (2021.01)
*H01M 50/229* (2021.01)

(52) U.S. Cl.
CPC ......... *H01M 50/14* (2021.01); *H01M 50/124* (2021.01); *H01M 50/229* (2021.01)

(58) Field of Classification Search
CPC ... H01M 50/14; H01M 50/124; H01M 50/229
See application file for complete search history.

(56) References Cited

U.S. PATENT DOCUMENTS 8,835,033 B2 9/2014 Choi et al.
9,254,609 B2 2/2016 Choi et al.
10,265,890 B2 4/2019 Burke et al.
11,283,128 B2 3/2022 Kuroiwa et al.
11,613,052 B2 3/2023 Burke et al.
2013/0252059 A1 9/2013 Choi et al.
2016/0297113 A1 10/2016 Burke et al.
2021/0154952 A1 5/2021 Takebe et al.
2021/0380801 A1* 12/2021 Akai ........................ C08K 5/12

FOREIGN PATENT DOCUMENTS

CN 103325963 A 9/2013
CN 104925142 A 9/2015
CN 107054481 A 8/2017
(Continued)

OTHER PUBLICATIONS

DE102009006960 translation (Year: 2010).*
(Continued)

*Primary Examiner* — Jane J Rhee
(74) *Attorney, Agent, or Firm* — Reising Ethington P.C.

(57) ABSTRACT

A battery shell includes a reinforcing nonwoven with long fibers and a polymer matrix.

20 Claims, 2 Drawing Sheets

(56) References Cited

FOREIGN PATENT DOCUMENTS

| | | | | |
|---|---|---|---|---|
| CN | 110167769 | A | | 8/2019 |
| CN | 111439106 | | * | 7/2020 |
| DE | 102006048291 | A1 | | 2/2008 |
| DE | 102010013131 | A1 | | 6/2011 |
| DE | 102011052513 | A1 | | 2/2013 |
| DE | 102012213308 | A1 | | 9/2013 |
| DE | 102013112413 | A1 | | 5/2014 |
| DE | 102012112063 | A1 | | 6/2014 |
| DE | 102013210094 | A1 | | 10/2014 |
| DE | 202014002557 | U1 | | 6/2015 |
| DE | 102015203952 | A1 | | 6/2016 |
| DE | 102017213434 | A1 | | 2/2019 |
| DE | 102017219240 | A1 | | 5/2019 |
| EP | 2940065 | A1 | | 11/2015 |
| JP | 2010153129 | A | | 7/2010 |
| JP | 2013201112 | A | | 10/2013 |
| JP | 2014125532 | A | | 7/2014 |
| JP | 2016199038 | A | | 12/2016 |
| WO | 2019044801 | A1 | | 3/2019 |
| WO | WO2019188873 | A1 | | 10/2019 |
| WO | 2020080412 | A1 | | 4/2020 |

OTHER PUBLICATIONS

CN Office Action for CN Application No. 2021-80071797.2 dated Sep. 24, 2025 (7 pages)—no translation available.

Notice of Allowance for JP Application No. 2023-526404 dated Nov. 5, 2024 (3 pages).

Translation of International Search Report and Written Opinion corresponding to International Application PCT/EP2021/079894, 9 pages, dated May 11, 2023.

German Search Report corresponding to priority application DE 10 2020 128 528.0, 7 pages, dated Sep. 6, 2021.

International Search Report and Written Opinion corresponding to International Application No. PCT/EP2021/079894, 15 pages, dated Feb. 8, 2022.

International Search Report English Translation corresponding to International Application No. PCT/EP2021/079894, 2 pages, dated Feb. 8, 2022.

JP Office Action for JP Application No. 2023-526404 dated Apr. 22, 2024 (11 pages).

* cited by examiner

BATTERY SHELL HAVING A REINFORCING NONWOVEN, METHOD OF PRODUCTION, AND TRACTION BATTERY

TECHNICAL FIELD

The disclosure relates to a battery shell having a reinforcing nonwoven, a method of production, and a traction battery.

BACKGROUND

A battery, in particular a traction battery for storing energy in a motor vehicle, consists of a multiplicity of components. One of the objects of a battery housing comprising at least one battery shell is to fasten and protect battery modules and other required components.

In the case of flat battery housings, in particular battery housings for use in electric vehicles, the requirement for the battery housing is to store the high mass of the battery modules reliably and robustly at comparatively high acceleration values, which is why modern battery housings have a comparatively high mass.

Furthermore, the requirement of a battery of an electric vehicle is that the battery modules are to be protected from damage in the event of any accidents.

SUMMARY

The object of the invention is that of providing an improvement over or an alternative to the prior art.

According to a first aspect, there is provided a battery shell, in particular a battery shell of a traction battery, wherein the battery shell has a bottom and side walls, wherein the battery shell has an inner side and an outer side, wherein the battery shell has a reinforcing nonwoven of long fibers and a polymer matrix.

In this regard, the following is explained conceptually:

First, it should be expressly noted that in the context of the present patent application, indefinite articles and numerical indications such as "one", "two", etc. are generally intended to be understood as "at least" indications, i.e., as "at least one . . . ", "at least two . . . ", etc. unless it is explicitly stated in the respective context or it is obvious or technically mandatory for the person skilled in the art that there is only "exactly one . . . ", "exactly two . . . ", etc.

In the context of the present patent application, the expression "in particular" is always to be understood in such a way that an optional, preferred feature is introduced with this expression. The expression is not to be understood as "specifically" or "namely."

A "traction battery" is understood to be an energy storage device, in particular an energy storage device for electrical power. A traction battery is preferably suitable for installation in and for driving electric cars. A traction battery is preferably suitable for use in a battery-electric motor vehicle and/or a motor vehicle having a battery-electric drive and an internal combustion engine.

A "battery shell" is understood to mean a housing part of a battery, in particular a traction battery.

In particular, a battery shell for receiving components of a battery is configured and accordingly has a receiving space for receiving components so that they can be protected by the battery shell from external influences and/or can be fastened at least indirectly in the battery shell.

Preferably, a battery shell is understood to mean a lower battery shell or an upper battery shell, the lower battery shell and the upper battery shell preferably jointly producing the essential components of the housing of a traction battery.

By a "reinforcing nonwoven" is meant a structure of fibers of limited length which have been joined and bonded together to form a fiber layer of irregular orientation, wherein a reinforcing nonwoven is designed to reinforce a fiber-plastic composite component. In particular, a reinforcing nonwoven in a crystallized polymer matrix can increase the stiffness and puncture resistance of a fiber-plastic composite component.

A "long fiber" is understood to be a fiber of limited length with a length greater than or equal to 0.5 mm. Fibers with a length of less than 0.5 mm are called short fibers.

In a fiber-plastic composite, a "polymer matrix" is understood to be a plastics material surrounding the reinforcing nonwoven, wherein the fibers of the reinforcing nonwoven are bonded to the polymer matrix by means of adhesive interaction.

Herein, a battery shell is proposed as a fiber-plastic composite component, wherein the fiber portion has a reinforcing nonwoven or consists of a reinforcing nonwoven.

The use of a reinforcing nonwoven makes it possible to produce a battery shell with high stiffness at a comparatively low weight. Furthermore, a particularly good puncture resistance of the battery shell can be achieved by means of a reinforcing nonwoven.

A pressing method is preferably used in the production of the battery shell proposed here. The pressing method enables distribution of a molten molding compound for forming the battery shell in complex geometries, in particular in typical geometries of battery shells. The reinforcing nonwoven proposed herein is a structure of long fibers of irregular orientation bonded together by means of adhesion amidst a crystalline and/or molten polymer matrix. This allows the molten molding compound to be distributed in the pressing tool together with the long fibers it contains. As soon as the molding compound solidifies in the pressing tool, it binds the long fibers, resulting in a battery shell that has a comparatively homogeneously distributed reinforcing nonwoven with a comparatively homogeneous fiber volume fraction.

Advantageously, a battery shell can thus be achieved that has comparatively homogeneous material properties despite the irregular orientation of the long fibers within the reinforcing nonwoven.

In accordance with a useful embodiment, the height of a side wall, as viewed in the normal direction of the bottom of the battery shell, is greater than 50 mm, preferably greater than 80 mm, further preferably greater than 110 mm, and more preferably greater than 140 mm.

Particularly preferably, the battery shell is monolithically formed, whereby the battery shell is manufactured in a single component in a cohesive and jointless manner.

Optionally, the long fibers have a length between 0.5 mm and 20 mm, preferably a length between 1.0 mm and 15 mm, and more preferably a length between 1.0 mm and 10 mm.

Here, it is preferably proposed that the long fibers have a length between 0.5 mm and 20 mm, wherein the length of the individual fibers can be substantially equally or differently distributed. Experiments have shown that this has the advantage of achieving particularly homogeneous material properties with comparatively high tensile strength in the comparatively complex component geometry of a battery shell.

It should be expressly noted that the above values for the length of the long fibers are not intended to be strict limits, but rather may be exceeded or undercut on an engineering scale without departing from the aspect of the invention as described. In simple terms, the values are intended to provide a guide to the size of the area of long fiber length proposed here.

Expediently, the battery shell has a fiber volume fraction greater than or equal to 20%, preferably a fiber volume fraction greater than or equal to 30%, and particularly preferably a fiber volume fraction greater than or equal to 40%.

In this regard, the following is explained conceptually:

A "fiber volume fraction" means the ratio of the volume of fibers to the total volume of a fiber-reinforced material.

Preferably, the battery shell has a fiber volume fraction greater than or equal to 45%, more preferably a fiber volume fraction greater than or equal to 50%, and most preferably a fiber volume fraction greater than or equal to 55%.

Further preferably, the battery shell has a fiber volume fraction greater than or equal to 60%, more preferably a fiber volume fraction greater than or equal to 70%, and most preferably a fiber volume fraction greater than or equal to 80%.

Advantageously, the area of the fiber volume fraction proposed here makes it possible to achieve good distributability of the molding compound, as a result of which the material properties of the battery shell are particularly homogeneous while at the same time having comparatively high tensile strength.

It should be explicitly pointed out that the above values for the aluminum content should not be understood as strict limits; rather, it should be possible to exceed or fall below them on an engineering scale without departing from the described aspect of the invention. In simple terms, the values are intended to provide a guide to the size of the area of fiber volume fraction proposed here.

In accordance with a preferred embodiment, the polymer matrix consists of a thermoplastic, in particular polypropylene, PA6 or PA6.6.

In this regard, the following is explained conceptually:

A "plastics material" is understood to mean a material that mainly consists of macromolecules.

Preferably, a plastics material is a thermoplastic plastics material, wherein a thermoplastic plastics material can be deformed in a material-dependent temperature range, wherein this process is reversible and can be repeated as often as desired by cooling and reheating to the molten state.

Preferably, a thermoplastic plastics material is understood to be a polyamide 6 (PA6) or a polyamide 6.6 (PA6.6).

Advantageously, a particularly rigid battery shell having a thermoplastic plastics material, which in particular has a high modulus of elasticity and/or a high degree of crystallization, can be achieved.

In accordance with an expedient embodiment, the polymer matrix consists of a thermosetting plastics material, whereby a particularly hard and strong battery shell can be achieved.

Preferably, the long fibers have a glass fiber and/or a carbon fiber and/or an aramid fiber.

Here, it is suggested that the long fibers consist of one fiber material or are blended from several different fiber materials. Since the material properties of glass fiber, carbon fiber and/or aramid fiber are different, the selection of the fibers and/or the composition of the fibers can be optimally adapted to the individual requirements of the battery shell.

In accordance with a particularly useful embodiment, the battery shell has a metal insert for fastening the battery shell, in particular a metal insert having an internal thread.

In this regard, the following is explained conceptually:

A "metal insert" is understood to be a body made of metal, which is fastened as a connecting means for fastening the battery shell.

Preferably, a metal insert has an internal thread and/or profiling on its outer surface. The internal thread is equipped for the production of a screw connection in conjunction with a corresponding screw. Further, the profiling on the outside is designed to form a form closure with the plastics material of the battery shell surrounding the metal insert, such that forces can be better transmitted between the battery shell and the metal insert.

Particularly preferably, the metal insert is a helicoil, which is further preferably formed as a spring thread. Preferably, such a helicoil can be inserted into the cavity before the battery shell is molded and can be molded in by the molding compound when the battery shell is molded.

Advantageously, the metal insert can be used to achieve a robust and resilient connection between the battery shell and its surrounding area, particularly with the body of a designated motor vehicle and/or an adjacent battery shell.

Particularly preferably, at least one side wall of the battery shell has a deviating height.

In load tests of battery housings consisting of two battery shells having a reinforcing nonwoven, it has been found that a battery housing is particularly robust and resistant to external loads if at least one side wall of the battery shell has a height that differs from the height of a deviating side wall. In accordance with a preferred embodiment, a battery housing may comprise two battery shells, each of which has a side wall of a height different from that of the opposite side wall, such that there is a separation plane that is angularly offset with respect to the respective bottoms of the battery shells.

A loaded battery housing behaves particularly advantageously if a separation plane extends between the two battery shells at an angle slightly offset from the respective bottoms of the battery shells. Preferably, a battery shell has connecting means to the designated surrounding bodyshell of a designated motor vehicle both on the side wall with the height deviating from the opposite side wall and on the opposite side wall, particularly preferably in the immediate vicinity of the designated separation plane. This makes it possible to transmit the loads from the battery shell to the designated surrounding body shell and the loads from the designated surrounding body shell to the battery shell in a particularly advantageous manner.

It has been found that load application by means of a connecting element in the vicinity of the separation plane of a battery shell, in particular in the vicinity of a separation plane which is angularly offset relative to the bottom of the battery shell, is particularly advantageous, such that a particularly lightweight battery shell can be achieved.

In other words, a battery shell is proposed here that has two side walls with constant but different heights and two side walls that extend a diagonal height level in such a manner that the height level between the two side walls with constant but different heights can be equalized by means of the side walls with the diagonal height level. This makes it possible to achieve a battery housing with a separation plane that is slightly offset at an angle to the respective bases of the battery shells.

Motor vehicles often have asymmetry with regard to the fastening points by means of which the battery shell proposed here is connected in a designated manner to the structure of the motor vehicle. The battery shell proposed here has side walls with a different height. This advantageously allows the battery shell to be ideally adapted to a motor vehicle having asymmetry with regard to the fastening points. The different heights of the side walls are preferably arranged in such a manner that the battery shell can be placed on the bodywork arranged asymmetrically on the designated motor vehicle by means of a collar extending along the upper edge of a side wall and can furthermore preferably be fastened to the latter at least indirectly by means of the collar or collars. Advantageously, horizontal forces occurring during operation of the designated motor vehicle can thus be ideally introduced into the battery shell proposed here.

According to a second aspect, there is provided a method of producing a battery shell, in particular a battery shell according to the first aspect, wherein the method comprises the following steps:

a) forming the battery shell from a preform having a reinforcing nonwoven of long fibers and a polymer matrix by means of a pressing tool, in particular by means of a plunge edge tool having a cavity; and
b) demolding the battery shell.

In this regard, the following is explained conceptually:

A "preform" is understood to be a preformed molding compound having a polymer matrix and a reinforcing nonwoven enclosed by the polymer matrix. Preferably, the polymer matrix consists of a thermoplastic plastics material, particularly polypropylene, PA 6 or PA 6.6.

Mold pressing is a method of production for processing thermoplastic plastics material or thermosetting plastics material into a molded part using a "pressing tool", particularly in the form of a plunge edge tool. The mold has a die and a core, which are adapted to form a cavity for molding an article. The cavity can be opened and closed by a relative movement between the die and the core.

For the production of an article, particularly a battery shell, the molding compound, particularly in the form of a preform, is introduced into the cavity of the mold. Preferably, the tool is tempered. The cavity is then closed using a pressure piston. The pressure causes the molding compound to acquire the shape specified by the cavity of the tool.

A "plunge edge tool" is understood to mean a pressing tool which has at least partially circumferential plunge edges for guiding the core and/or for sealing the cavity. Preferably, the dipping edges are designed in the form of exchangeable dipping edge strips.

Preferably, a battery shell can be produced by means of a plunge edge tool, in particular a plunge edge tool with variable volume, the ridge of which, if it has one, points in the direction of the tool stroke.

A method for the production of a battery shell is proposed herein, in which a preform is formed into a battery shell within a pressing tool. After molding, the polymer matrix crystallizes and the solidified battery shell can be removed after opening the pressing tool.

The preform used consists of a molding compound having a polymer matrix and a reinforcing nonwoven of long fibers oriented non-uniformly within the molding compound.

During demolding by means of the pressing tool, a pressure force is transmitted from the pressing tool to the preform, causing the preform to distribute itself within the cavity of the pressing tool. This also results in a comparatively homogeneous distribution of the unevenly oriented long fibers within the cavity, such that the reinforcing nonwoven is also distributed comparatively evenly within the cavity of the pressing tool.

Since the cavity has the negative shape of a battery shell according to the method of production proposed herein, a battery shell can be formed in this manner. Due to the comparatively homogeneous distribution of the molding compound, the finished battery shell also has comparatively homogeneous material properties.

By achieving a required cavity pressure, sufficient compaction of the molding compound is achieved, which can support a robust structure of the reinforcing nonwoven.

Advantageously, the method of production proposed here can be used to manufacture a large number of battery shells as fiber-plastic composite components with comparatively homogeneous material properties at high cycle rates and thus at comparatively low cost.

Particularly when using a plunge edge tool, it can be advantageously achieved that the weighed molding compound is not pressed out of the cavity of the tool again, wherein the close tolerances of the die and punch allow the cavity to be simultaneously vented during the molding of the molding compound, whereby a complete filling of the cavity with molding compound can be achieved, particularly with complex tools and long flow paths.

In particular, the use of a plunge edge tool further enables a battery shell to be formed by the method proposed herein that has no ridge or only a minimal ridge, thereby avoiding or reducing any reworking that may be necessary.

Preferably, a molding compound for the preform is provided by mixing, particularly by means of an extruder, a molten polymer, particularly a molten thermoplastic plastics material, with long fibers.

In this regard, the following is explained conceptually:

A "molding compound" is understood to be a mixture of long fibers and a polymer matrix, wherein the long fibers have already been surrounded by the polymer matrix, and wherein the long fibers have already been assembled into a fiber material with irregular orientation and bonded together by means of the polymer matrix and by adhesive interaction.

In accordance with a first embodiment proposed herein, the molding compound is obtained by mixing a melt stream of polymeric material and long fibers in a second extruder. Mixing further creates the irregular orientation of the long fibers within the molding compound already within the second extruder, which is used to form the reinforcing nonwoven.

Prior to mixing within the second extruder by means of a first extruder, in accordance with the first variant, a polymer material is melted, optionally homogenized and provided as a melt stream, which is mixed together with the long fibers in the second extruder to form the molding compound.

In accordance with the second variant proposed here, the molding compound is prepared in a single extruder, which has two portions. In the first portion, the polymer material is melted and, if necessary, homogenized. Subsequently, the long fibers are fed to the melt stream at the beginning of the subsequent second portion, are conveyed by the extruder and the melt stream already therein, are mixed with the melt stream by the extruder, and the molding compound is homogenized.

Optionally, before the battery shell is molded out, the preform is formed by means of an extruder nozzle;

and/or introduced into the pressing tool, in particular the plunge edge tool.

In accordance with a first alternative, it is proposed here that the preform is formed from the molding compound by means of an extruder nozzle, wherein the preform is introduced directly from the extruder nozzle into the opened pressing tool.

For this purpose, for example, the extruder nozzle can be guided over the open pressing tool by a suitable mechanism, preferably by means of a manipulator, when the preform is being formed, whereby the formed preform is deposited in the pressing tool simultaneously with the forming process.

In accordance with a second variant, it is proposed that the preform is first formed by a stationary extruder nozzle and then transferred to the open pressing tool. This can preferably be done manually or by means of a manipulator.

In accordance with an expedient embodiment, the extruder nozzle is a wide slot nozzle.

Advantageously, this allows a substantially rectangular preform to be formed, which can be brought into the pressing tool by simple means or can also be deposited in the pressing tool by means of a movable extruder nozzle.

Preferably, the cavity of the pressing tool, particularly the plunge edge tool, has a variable volume.

In this regard, the following is explained conceptually:

If the pressing tool, in particular the plunge edge tool, has a "variable volume", this is understood to mean that the cavity of the tool does not have a defined end position, in particular, the movable tool half does not have a defined end position relative to the stationary tool half. In many cases, only one half of the tool is movably mounted, in particular the upper tool, so that the upper tool does not have a defined end position relative to the lower tool half (lower tool). In other words, the material thickness of the battery shell results according to the amount of molding compound introduced into the pressing tool.

Advantageously, the quantity of molding compound used for a battery shell can thus be measured in a wider tolerance range compared to a pressing tool without variable volume. In this context, it is preferably proposed to define the minimum amount of molding compound with which a battery shell is achieved that has at least the required component stiffness.

Furthermore, a pressing tool, in particular a plunge edge tool, with variable volume enables filigree details of the battery shell to be formed without the risk of overfilling and/or underfilling the tool.

In accordance with an optional embodiment, an insert is placed in the cavity prior to forming the battery shell.

In this regard, the following is explained conceptually:

An "insert" is understood to be a preformed part which is introduced into the cavity of the tool alongside the preform and formed into an article together with the preform.

Preferably, an insert is a metal insert which bonds to the molding compound by adhesive interaction.

Preferably, an insert is a plastics material component that is bonded to the molding compound by adhesion and/or mixing.

It is particularly expedient to introduce a metal insert for fastening the battery shell, in particular a metal insert having an internal thread, into the cavity before forming the battery shell, in particular the metal insert is brought into an operative connection with a holding device in the cavity.

A "holding device" is understood to mean any apparatus inside the cavity which is designed to fix the metal insert during the molding of the battery shell in such a manner that it can be positioned accurately in the molded battery shell.

Here, it is proposed that the battery shell together with its connecting means be formed in one cycle. Preferably, a connecting means is adapted to allow a component and/or other attachment for the designated traction battery to be connected to the battery shell inside the battery shell. Preferably, a connecting means is arranged for connecting the battery shell to its surrounding, in particular to a designated motor vehicle.

Preferably, the metal insert is a helicoil insert, which is preferably designed as a spring thread. This can be inserted into the cavity before the battery shell is molded, such that it can be molded in by the molding compound when the battery shell is molded out.

It should be expressly noted that the subject matter of the second aspect can advantageously be combined with the subject matter of the preceding aspect of the invention, both individually or cumulatively in any combination.

According to a third aspect, there is provided a battery shell, in particular a battery shell of a traction battery, wherein the battery shell has a bottom and side walls, wherein the battery shell has an inner side and an outer side, wherein the battery shell has been produced by a method according to the second aspect.

It is understood that the advantages of a method of production of a battery shell according to the second aspect, as described above, extend directly to a battery shell produced by a method of production of a battery shell according to the second aspect.

It should be expressly noted that the subject matter of the third aspect can advantageously be combined with the subject matter of the preceding aspects, both individually and cumulatively in any combination.

According to a fourth aspect, there is provided a traction battery, in particular a traction battery for a motor vehicle, having a battery shell according to the first aspect or the third aspect.

It is understood that s advantages of a battery shell in accordance with the first aspect or the third aspect, as described above, have direct extension to a traction battery having a battery shell in accordance with the first aspect or the third aspect.

It should be expressly noted that the subject matter of the fourth aspect is advantageously combinable with the subject matter of the preceding aspect, both individually or cumulatively in any combination.

DESCRIPTION OF THE DRAWINGS

Further advantages, details and features will be apparent below from the examples of embodiments explained. In the drawings, in detail.

DESCRIPTION OF EMBODIMENTS

Figure 1:
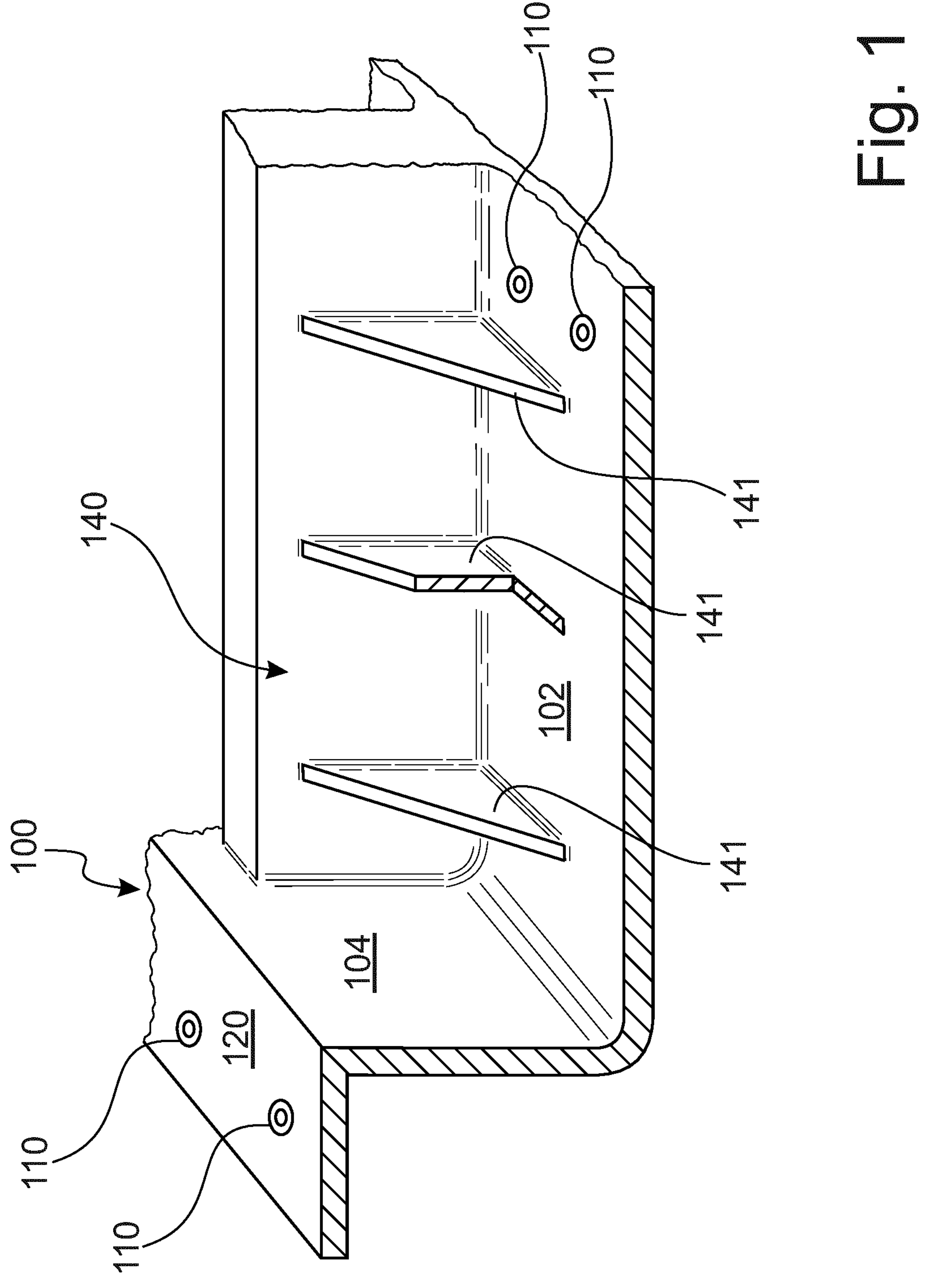
FIG. 1: shows schematically a section of a battery shell.

The battery shell 100 in FIG. 1 is monolithically molded from a thermoplastic plastics material (not shown) that encloses a reinforcing nonwoven (not shown).

The battery shell 100 has a bottom 102, at least one side wall 104, and a peripheral collar 120.

Furthermore, the battery shell 100 has an inner reinforcing nonwoven element 140 for reinforcing the battery shell 100, which is also monolithically formed with the battery shell 100 and thus also has a reinforcing nonwoven (not shown).

The inner stiffening element 140 has stiffening ribs 141 on both sides (only visible on one side), which additionally stiffen the battery shell 100 and also have a reinforcing nonwoven (not shown).

The collar 120 also has a reinforcing nonwoven (not shown) within it.

The collar 120 of the battery shell 100 further has at least one metal insert 110, by means of which the battery shell 100 can be fastened and/or connected to a deviating battery shell (not shown) to form a battery housing (not shown).

Also, the bottom 102 of the battery shell 100 has at least one metal insert 110 by means of which designated components (not shown) in the battery shell 100 can be connected.

Figure 2:
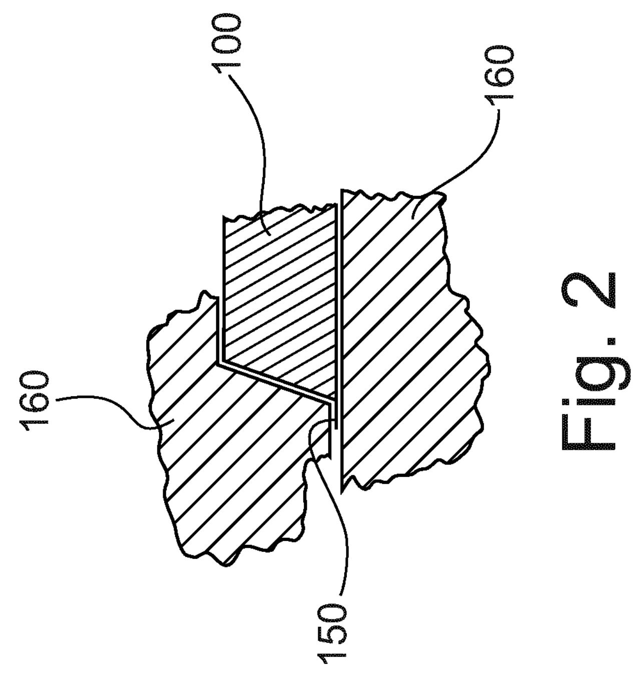
FIG. 2: shows a schematic of a section of a battery shell in a section of a pressing tool with standard separation.

FIG. 2 shows a section of a battery shell 100 in a section of a multi-part pressing tool with standard separation (160). As can be seen, any ridge 150 of the battery shell 100 extends in the separation plane (not designated) of the pressing tool with standard separation (160).

Figure 3:
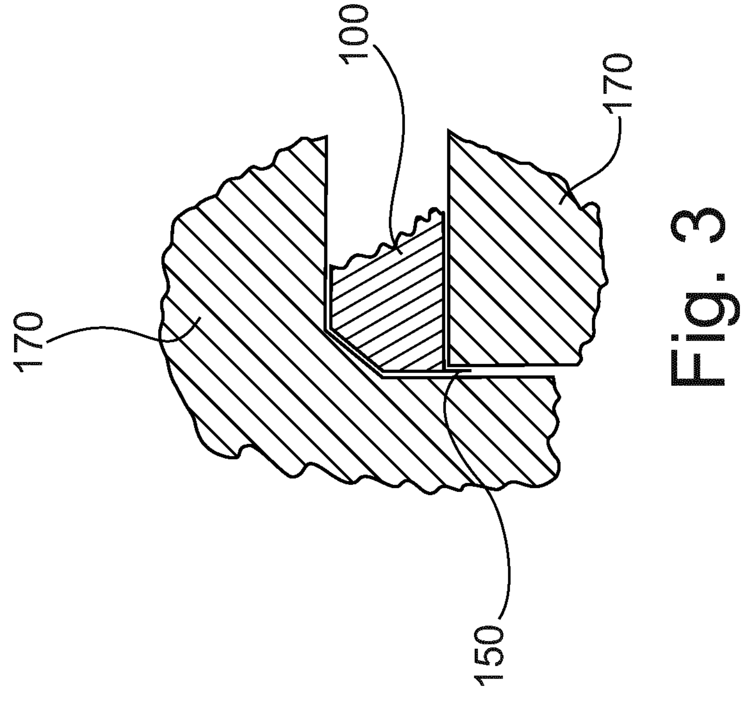
FIG. 3: shows schematically a section of a battery shell in a section of a plunge edge tool.

FIG. 3 shows a section of a battery shell 100 in a section of a multi-part plunge edge tool (170). Here, any ridge 150 of the battery shell 100 extends in the direction (not designated) in which the plunge edge tool (170) can be opened and closed.

It is to be understood that the foregoing is a description of one or more preferred exemplary embodiments of the invention. The invention is not limited to the particular embodiment(s) disclosed herein, but rather is defined solely by the claims. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

- 100 battery shell
- 102 bottom
- 104 side wall
- 110 metal insert
- 120 collar
- 140 inner stiffening element
- 141 stiffening ribs
- 150 ridge
- 160 Pressing tool with standard separation
- 170 plunge edge tool

The invention claimed is:

1. A battery shell of a traction battery, the battery shell comprising:
- a bottom and side walls,
- an inner side, and
- an outer side, characterized in that the battery shell has a reinforcing nonwoven of long fibers and a polymer matrix,
- wherein the battery shell is formed by a plunge edge mold.

2. The battery shell according to claim 1, characterized in that the long fibers have a length between 0.5 mm and 20 mm.

3. The battery shell according to claim 1, characterized in that the battery shell has a fiber volume fraction greater than or equal to 20%.

4. The battery shell according to claim 1, characterized in that the polymer matrix is a thermoplastic material.

5. The battery shell according to claim 1, characterized in that the long fibers have a glass fiber and/or a carbon fiber and/or an aramid fiber.

6. The battery shell according to claim 1, characterized in that the battery shell has a metal insert for fastening the battery shell.

7. The battery shell according to claim 1, characterized in that at least one side wall of the battery shell has a deviating height.

8. A method of production of the battery shell of claim 1, wherein the method comprises the following steps:
- forming the battery shell from a preform having the reinforcing nonwoven using a plunge edge mold having a cavity; and
- demolding the battery shell.

9. The method according to claim 8, characterized in that a molding compound for the preform is provided by mixing a molten thermoplastic material with long fibers.

10. The method according to claim 8, characterized in that, prior to forming the battery shell, the preform is formed by an extruder nozzle and/or introduced into the plunge edge mold.

11. The method according to claim 10, characterized in that the extruder nozzle is a wide slot nozzle.

12. The method according to claim 10, characterized in that the cavity of the plunge edge mold has a variable volume.

13. The method according to claim 8, characterized in that an insert is introduced into the cavity before the battery shell is formed.

14. The method according to claim 8, characterized in that, prior to forming the battery shell, a metal insert for fastening the battery shell is introduced into the cavity.

15. A traction battery having a battery shell according to claim 1.

16. The battery shell according to claim 1, characterized in that the polymer matrix is made of a polypropylene, PA6 or PA6.6.

17. The battery shell according to claim 6, wherein the metal insert has an internal thread.

18. The method of claim 14, wherein the metal insert is brought into an operative connection with a holding device in the cavity when introduced into the cavity.

19. The battery shell of claim 1, wherein the plunge edge mold has at least partially circumferential plunge edges for guiding a core of the mold and/or for sealing a cavity of the mold.

20. The battery shell of claim 19, wherein the plunge edges extend in a direction in which the plunge edge mold can be opened and closed.

* * * * *